United States Patent
Mallinger et al.

(10) Patent No.: US 8,500,163 B2
(45) Date of Patent: Aug. 6, 2013

(54) AIRBAG VENT ASSEMBLY

(75) Inventors: Heather Mallinger, Washington, MI (US); Mary Raska, Romeo, MI (US); Derrick Ledford, Chesterfield, MI (US); Lyle Curry, White Lake, MI (US)

(73) Assignee: Key Safety Systems, Inc, Sterling Heights, MI (US)

( * ) Notice: Subject to any disclaimer, the term of this patent is extended or adjusted under 35 U.S.C. 154(b) by 161 days.

(21) Appl. No.: 12/974,398

(22) Filed: Dec. 21, 2010

(65) Prior Publication Data

US 2012/0153603 A1     Jun. 21, 2012

(51) Int. Cl.
*B60R 21/2338*  (2011.01)
*B60R 21/239*  (2006.01)

(52) U.S. Cl.
USPC ............... 280/739; 280/742; 280/743.2

(58) Field of Classification Search
USPC ............. 280/734, 735, 739, 743.1, 743.2
See application file for complete search history.

(56) References Cited

U.S. PATENT DOCUMENTS

| | | | |
|---|---|---|---|
| 5,246,250 A | 9/1993 | Wolanin et al. | |
| 5,280,953 A | 1/1994 | Wolanin et al. | |
| 5,405,166 A | 4/1995 | Rogerson | |
| 5,492,363 A | 2/1996 | Hartmeyer et al. | |
| 5,743,558 A * | 4/1998 | Seymour | 280/739 |
| 6,076,854 A | 6/2000 | Schenck et al. | |
| 6,095,557 A | 8/2000 | Takimoto et al. | |
| 6,139,048 A | 10/2000 | Braunschädel | |
| 6,773,030 B2 * | 8/2004 | Fischer | 280/739 |
| 6,832,778 B2 | 12/2004 | Pinsenschaum et al. | |
| 6,991,258 B2 * | 1/2006 | Hawthorn et al. | 280/742 |
| 7,264,268 B2 * | 9/2007 | Ehrke | 280/729 |
| 7,334,814 B2 | 2/2008 | Fischer et al. | |
| 7,607,683 B2 | 10/2009 | Fischer et al. | |
| 7,874,583 B2 * | 1/2011 | Sahm et al. | 280/739 |
| 2004/0012179 A1 | 1/2004 | Pinsenschaum et al. | |
| 2004/0012180 A1 | 1/2004 | Hawthorn et al. | |
| 2005/0098990 A1 | 5/2005 | Pinsenschaum et al. | |
| 2006/0071462 A1 | 4/2006 | Smith et al. | |
| 2006/0273562 A1 | 12/2006 | Fischer et al. | |
| 2007/0262572 A1 | 11/2007 | Fischer et al. | |
| 2008/0119992 A1 | 5/2008 | Fischer et al. | |
| 2008/0315567 A1 | 12/2008 | Fischer et al. | |
| 2009/0033081 A1 | 2/2009 | Fischer et al. | |

* cited by examiner

*Primary Examiner* — Joseph Rocca
*Assistant Examiner* — Laura Freedman
(74) *Attorney, Agent, or Firm* — Markell Seitzman

(57) ABSTRACT

An airbag cushion of flexible sheet material has a vent opening with a vent cover of flexible sheet material stitched to an interior surface of the airbag cushion aligned with the vent opening in the airbag cushion to form a pocket. The vent cover has a vent opening therein allowing inflation gas to escape from the cushion via the vent opening. A vent flap of flexible sheet material is disposed at least partially within the pocket and inboard of the vent openings in the airbag cushion and vent cover. A tether extends inboard from vent flap to a tether end that is fixed in a releasable manner to a tether end securing device fixed to a module housing. The tether end is released in response to a sensor signal.

7 Claims, 12 Drawing Sheets

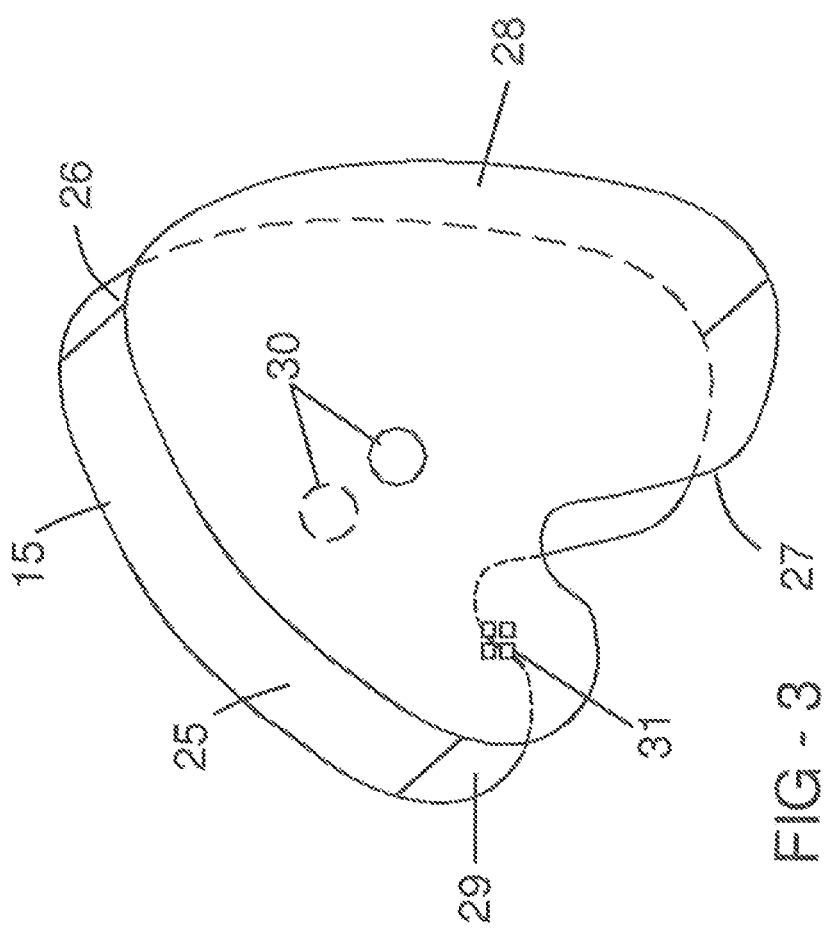

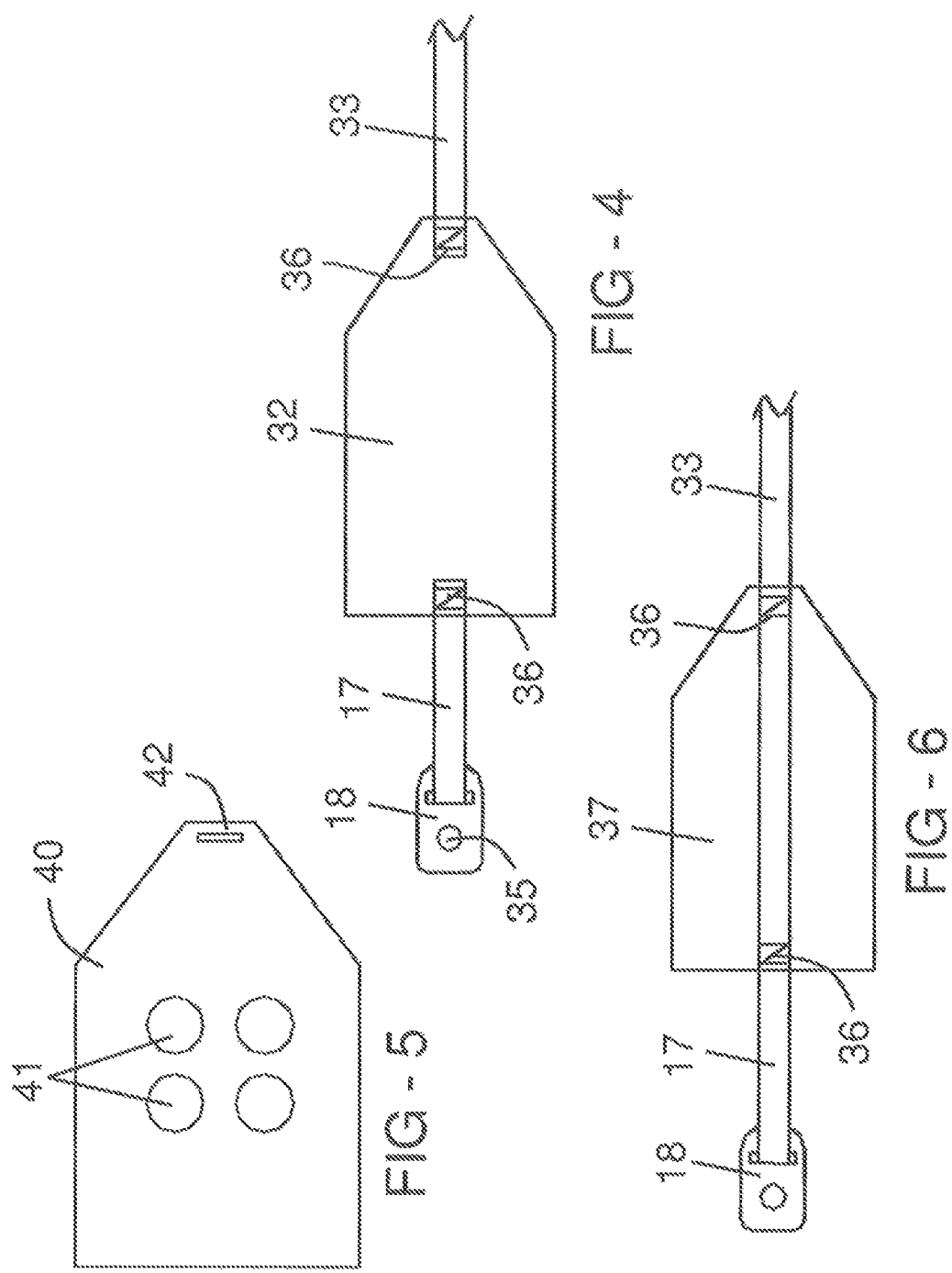

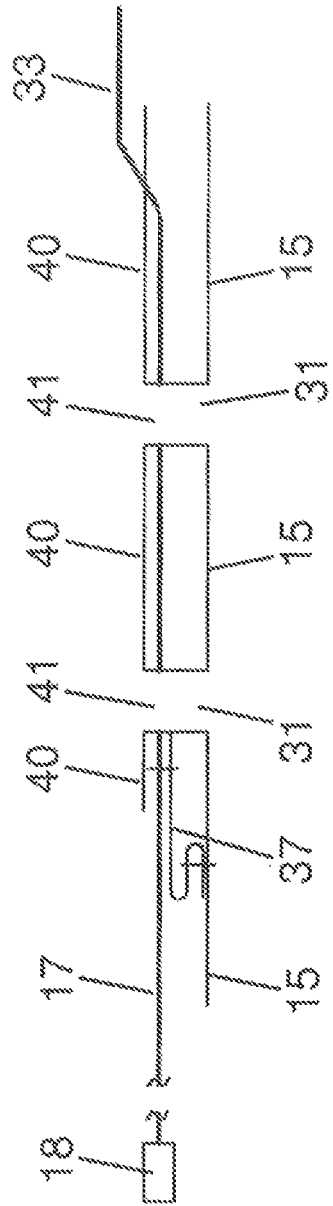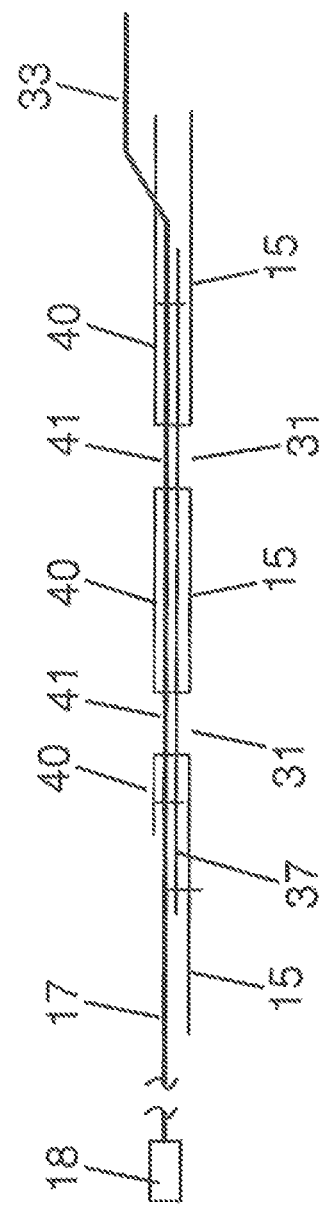

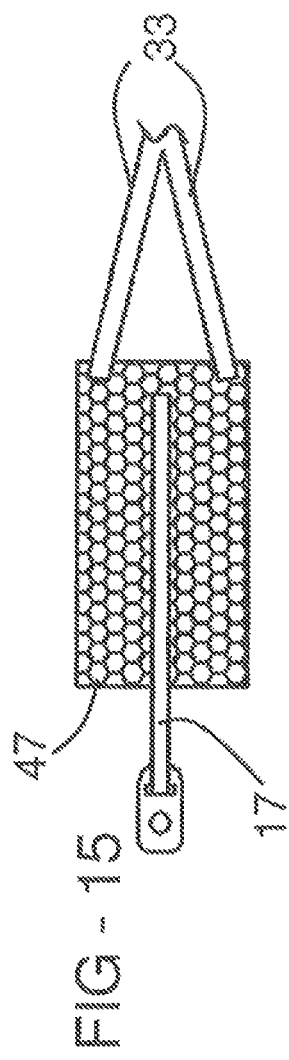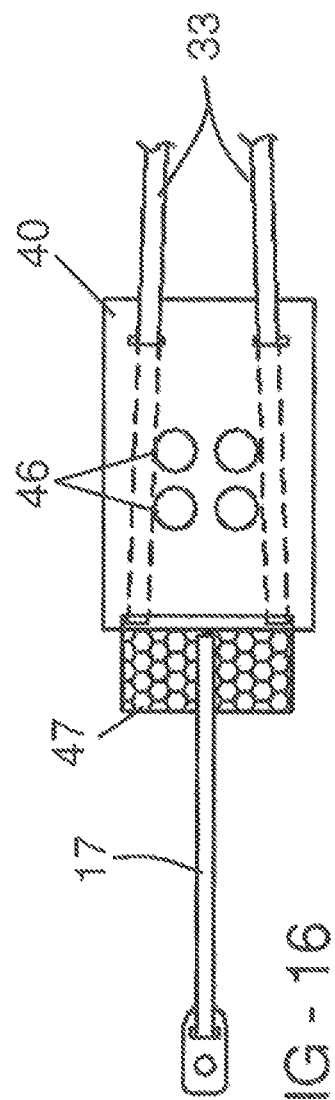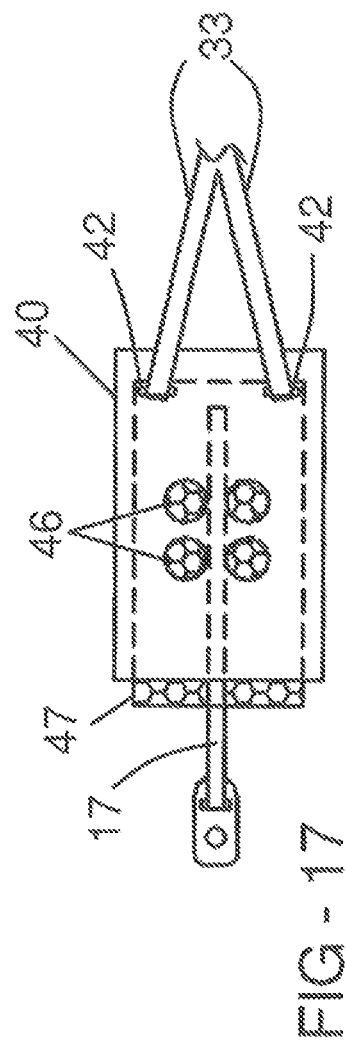

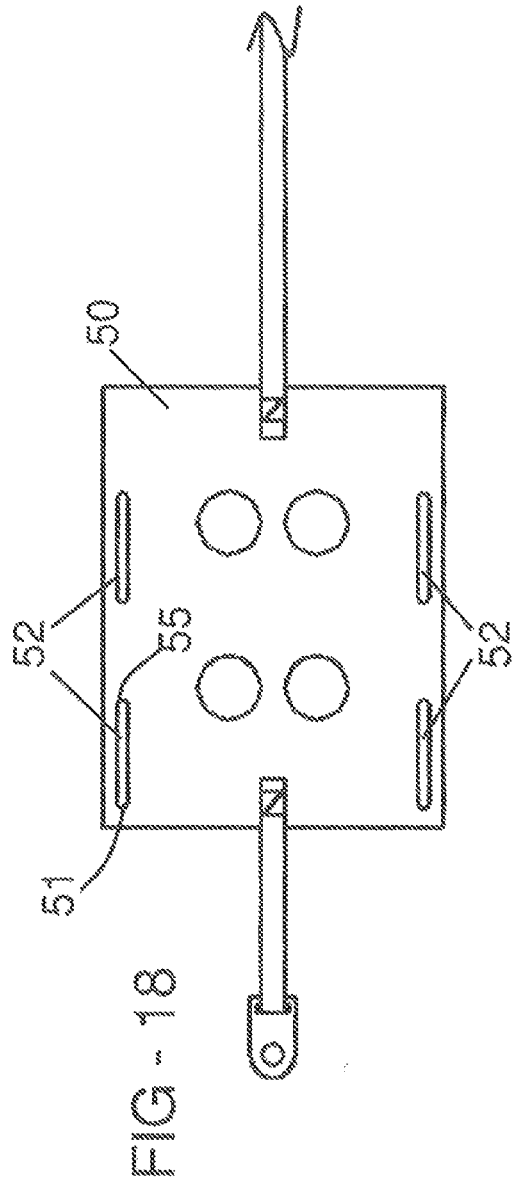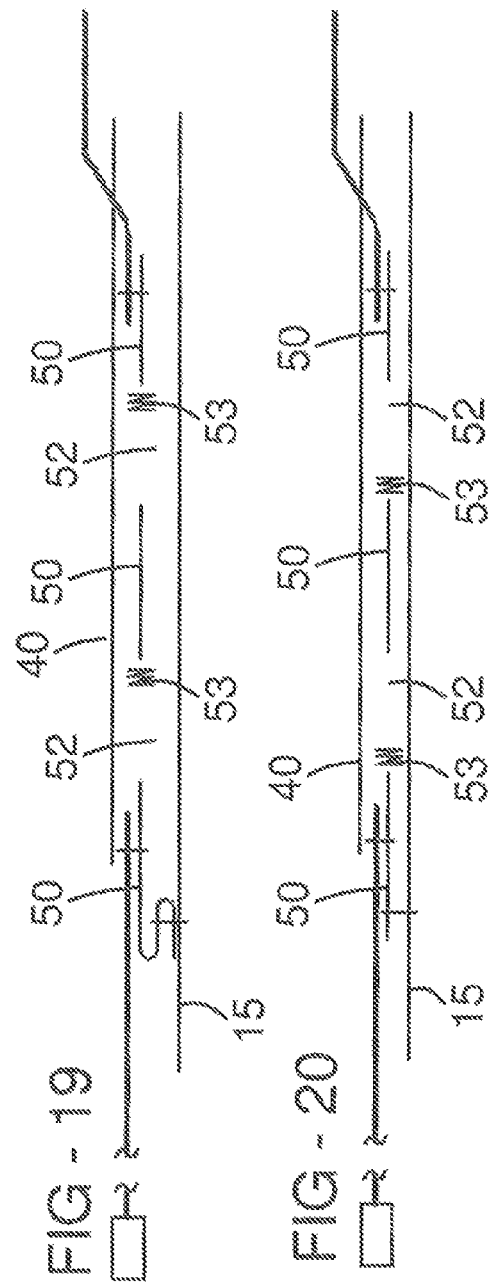

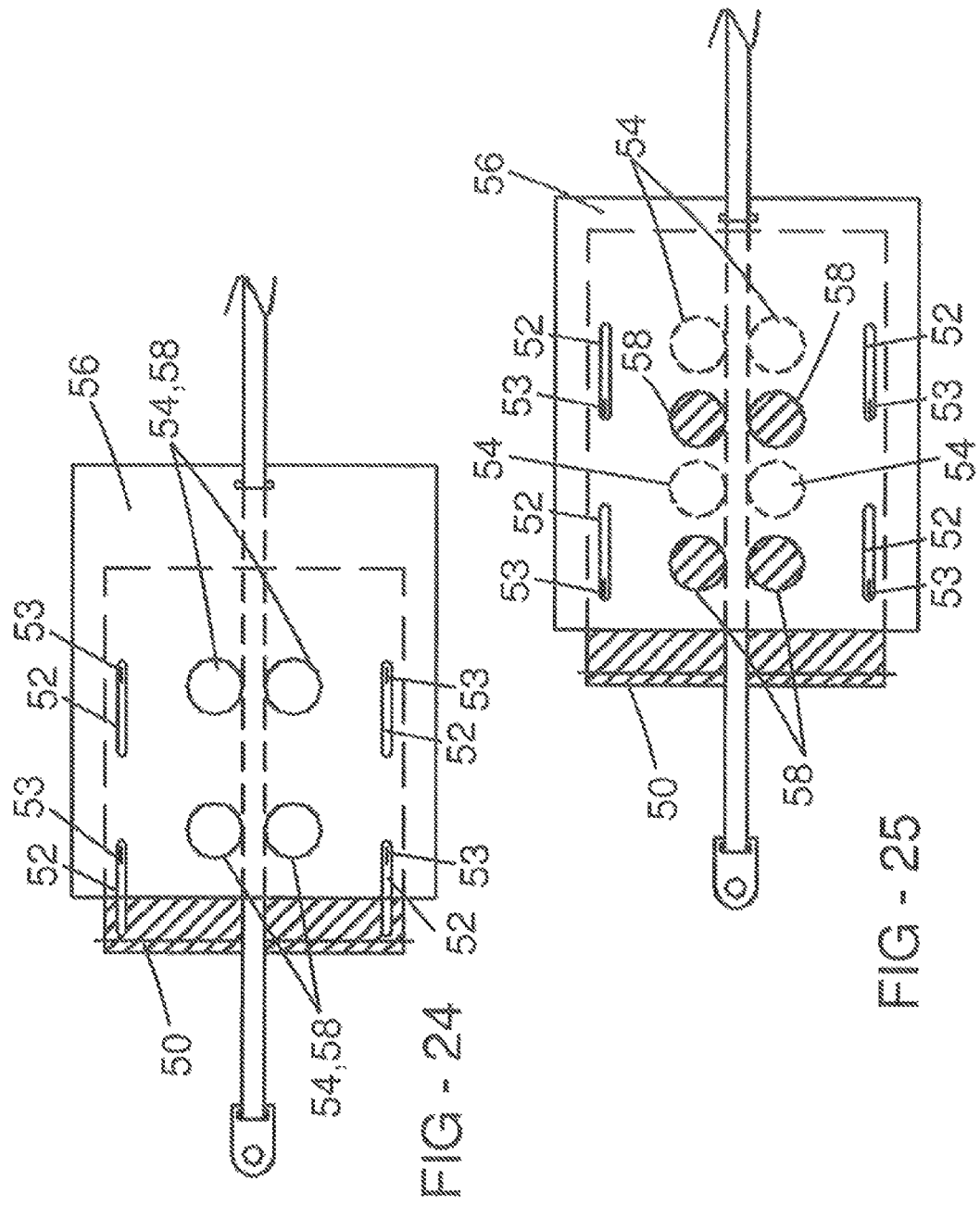

US 8,500,163 B2

AIRBAG VENT ASSEMBLY

BACKGROUND AND SUMMARY OF THE INVENTION

The invention relates to a vehicle airbag and more particularly provides a vent assembly for installation on a wall of an airbag to control the flow of airbag.

It is well known to provide an inflatable airbag for restraining a vehicle occupant. The airbag assembly includes a folded bag which is connected to a source of inflation gas. Release of the inflation gas into the airbag causes the airbag to expand rapidly such that a face wall of the airbag is displaced toward contact with the vehicle occupant. It is well known to provide one or more vent openings in the walls of the airbag to vent inflation gas from the interior of the airbag into the occupant compartment of a vehicle. Airbag vents are commonly provided in a base wall portion of the airbag to direct the vented gas away from the vehicle occupant. It is known to employ various flow control devices to control the flow of inflation gas through the vent opening. The present invention provides a new and improved airbag valve assembly for an airbag.

U.S. Pat. No. 5,246,250 teaches an airbag valve assembly having first and second panels of flexible sheet material overlying one another and being permeable to pass gas therethrough. The panels have edge portions joined together to form a housing envelope. A valve flap panel of flexible sheet material is interposed between the first and second panels so that the valve flap panel is supported for movement across the first and second panels. A tether has a first end attached to the valve flap panel and a second end attached to the fabric of the airbag and is operable to actuate the tether and move the valve flap across the first and second gas permeable panels. The valve flap may be impermeable to airbag inflation gas, with the valve being normally open, but closed when the valve flap is moved by the tether across the first and second panels.

U.S. Pat. No. 6,832,778 B2 teaches an airbag comprising: a variable depth inflatable airbag cushion adapted to be selectively inflatable to a first depth or a second depth greater than the first depth. The airbag cushion includes at least one vent opening. A cover element of substantially pliable material is disposed in overlying relation to the vent opening. The cover element includes an aperture normally disposed in substantial alignment with the vent opening and a blocking portion normally disposed within a folded pleat structure disposed outboard of the vent opening. The cover element is operatively connected to the airbag cushion such that upon inflation of the airbag cushion to said first depth the blocking portion and the aperture remain in their normal positions such that upon inflation of the airbag cushion to said second depth the cover element is placed into tension thereby pulling the aperture away from the vent opening while at least partially collapsing the pleat structure such that the blocking portion is moved into alignment over the vent opening so as to decrease venting across the airbag cushion. The cover element is operatively attached to the airbag cushion by at least one elongate tensioning strap extending between the cover element and at least one shape defining tethering element supported at a surface of the airbag cushion.

There is provided in accordance with one aspect of the invention an airbag for restraining a vehicle occupant comprising an inflatable airbag cushion comprising a flexible sheet material that has at least one vent opening therein. A vent cover comprising a flexible sheet material is fixed to an interior surface of the airbag cushion aligned with the vent opening in the airbag cushion to form a pocket. The vent cover has at least one vent opening therein that allows an airbag inflation gas to escape from the airbag cushion. A vent flap comprising a flexible sheet material is disposed at least partially within the pocket and inboard of the vent openings in the airbag cushion and vent cover. The vent flap is fixed to a tether that extends outboard from the vent flap through an opening in the vent cover to a first end of the tether that is attached directly to the airbag cushion outboard of the vent cover in a permanent manner. The tether also extends inboard from the vent flap to a second end of the tether that is fixed in a releasable manner to a device that reacts to a signal to release the second end of the tether when a sensor senses a predetermined parameter during the deployment of the airbag. The vent flap is pulled in an outboard direction by the tether to become interposed between the vent openings in the airbag cushion and the vent cover and prevent the escape of inflation gas from the airbag cushion through the vent openings in the airbag cushion and the vent cover.

BRIEF DESCRIPTION OF THE DRAWINGS

FIG. 3 shows an exemplary inflatable cushion used in the practice of the present invention.

FIG. 4 is a plan view of a vent flap according to a first embodiment of the invention.

FIG. 5 is a plan view of a vent cover used in the present invention.

FIG. 6 is a plan view of a vent flap according to a second embodiment of the invention.

FIG. 8 is a diagrammatic representation of a side section view of the assembly of FIG. 7.

FIG. 10 is a diagrammatic representation of a side section view of the assembly of FIG. 9.

FIG. 15 is a plan view of a vent flap according to a third embodiment of the invention.

FIG. 16 is a plan view of a vent flap according to a fourth embodiment assembled wherein a vent cover with the vent flap is in a stored configuration.

FIG. 17 is a plan view of the vent flap of FIG. 15 assembled with a vent cover wherein the vent flap is in a deployed configuration.

FIG. 18 is a plan view of a vent flap according to a fifth embodiment wherein the tether comprises two pieces, and with an additional feature comprising two pairs of parallel slots.

FIG. 19 is a side schematic representation of a vent flap according to the fifth embodiment assembled with a vent cover and an airbag, wherein the vent flap is in a stored configuration.

FIG. 20 is a side schematic representation of a vent flap according to the fifth embodiment assembled with a vent cover and an airbag, wherein the vent flap is in a deployed configuration.

FIG. 24 is a plan view of the vent flap of FIG. 23 assembled with a vent cover wherein the vent flap is in a stored configuration.

FIG. 25 is a plan view of the vent flap of FIG. 23 assembled with a vent cover wherein the vent flap is in a deployed configuration.

DETAILED DESCRIPTION OF THE DRAWINGS

Figure 1:
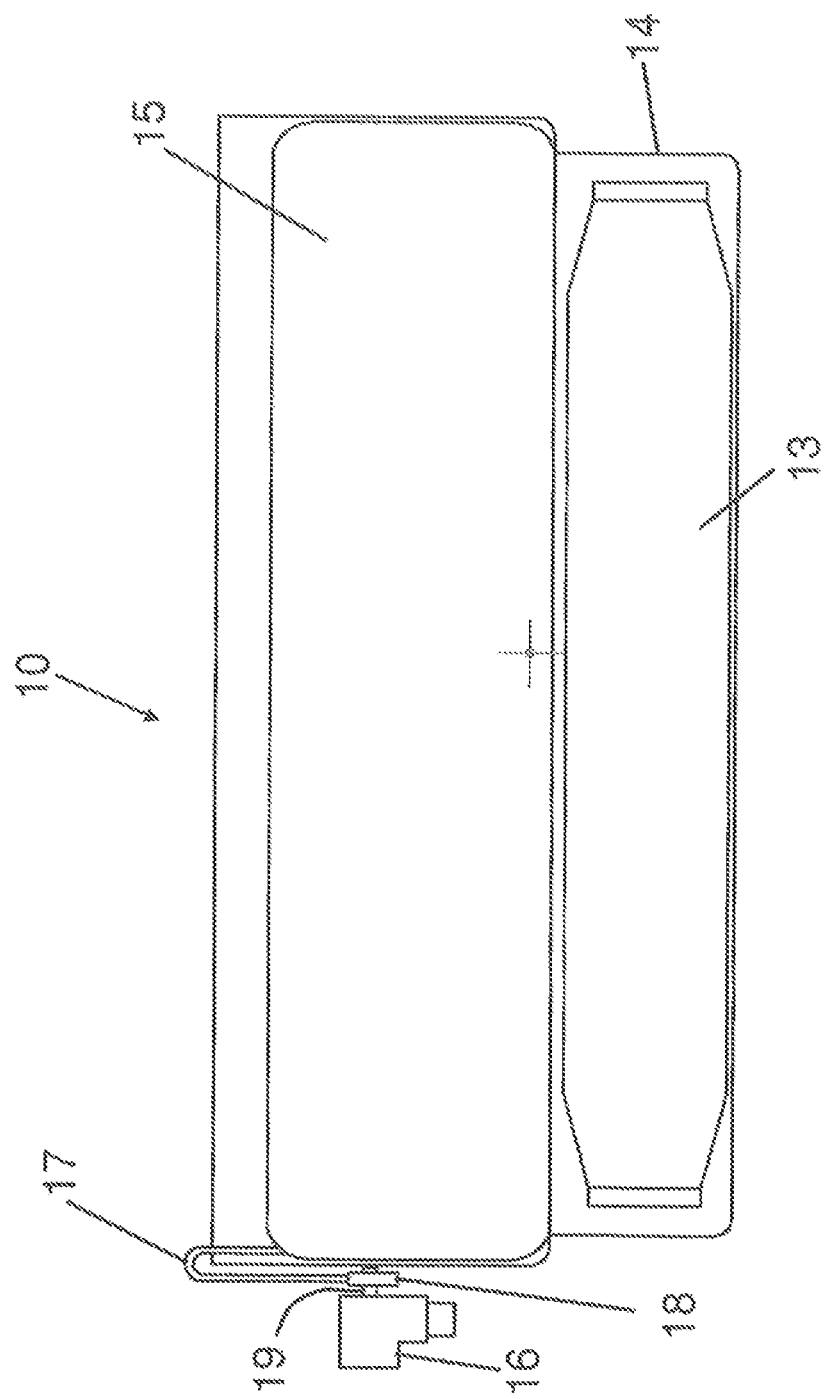
FIG. 1 is a schematic representation of an airbag module according to the present invention.

FIG. 1 is a schematic representation of an airbag module 10 for restraining a vehicle occupant. An inflator 13 is located in a module housing 14 for providing an inflation gas to an airbag cushion 15 that is fixed to the module housing. For reasons that will be presented below a tether 17 has a tether end 18 that is fixed in a releasable manner to a tether end securing device 16 that is fixed directly or indirectly to the module housing 14. A pin 19 is a component of the tether end securing device 16 and passes through a loop or eyelet to secure the tether end 18 in a releasable manner. The tether end securing device may comprise a pyrotechnic, electrical, or magnetic actuator that causes the pin 19 to be pulled away from, and release, the tether end 18 when activated by a signal from an electronic control system.

Figure 2:
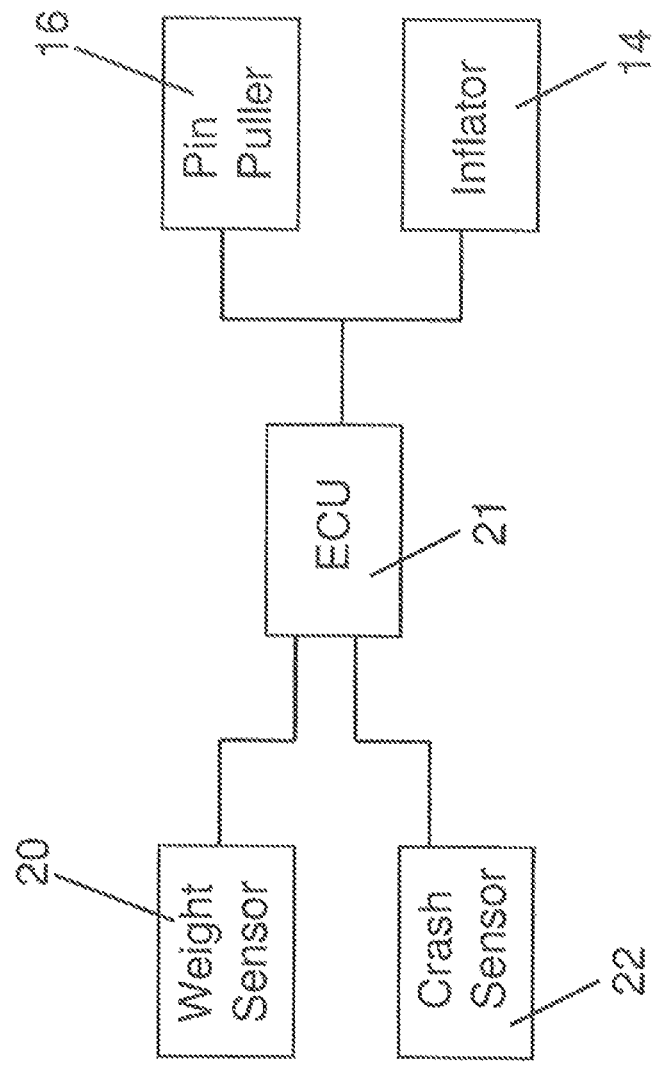
FIG. 2 is a schematic representation of an electronic control system for an airbag module according to the present invention.

FIG. 2 is a schematic representation of an electronic control system for an airbag module according to the present invention. A sensor 20 is configured to sense a predetermined parameter such as the size of a vehicle occupant that a deploying airbag cushion will encounter in the event of a vehicle crash. It may be desirable to inflate an airbag cushion to a greater or lesser volume based upon the size of a person occupying a front passenger seat. If the passenger is above a predetermined size, as indicated for instance by the sensor 20 being a weight sensor located in a front passenger seat, the inflated volume of the airbag cushion does not need to be over a predetermined value. However, if the weight sensor senses that the size of the passenger is below a predetermined size, such as a female of a size smaller than ninety-five percent of the overall population of females, the inflated volume of the airbag will be maximized. A crash sensor 22 operates to sense a vehicle crash. Both the weight sensor 20 and the crash sensor 22 send signals to an electronic control unit (ECU) which processes those signals, and in the event the ECU determines that the vehicle is involved in a crash sends a signal to the inflator 14 to activate the inflator and provide inflation gas to the airbag cushion 15 causing the airbag cushion to be deployed. If the ECU determines that a predetermined parameter has been met, as sensed by the weight sensor 20, the ECU will send a signal to the tether end securing device 16 instructing the device to release the end of the tether during a deployment of the airbag.

FIG. 3 shows an exemplary inflatable airbag cushion 15 that may be used in the practice of the present invention. To facilitate the disclosure of the invention the airbag cushion 15 is shown in a deployed configuration. The airbag cushion illustrated is of a type used to protect an occupant of a front passenger seat of a vehicle. Such an airbag cushion may be deployed from either a top or frontal surface of an instrument panel of a vehicle. The exemplary airbag cushion illustrated comprises a flexible sheet material and has a top panel 25, front panel 26, bottom panel 27 and a pair of opposed side panels 28, 29. Portions of the airbag cushion surrounding an opening, or throat 30, of the airbag cushion are fixed to a module housing 14 (see FIG. 1) such that inflation gas provided by an inflator 13 is provided to the interior of the airbag cushion, whereby the airbag cushion is inflated and deployed from the module housing. At least one vent opening 31 is provided in the airbag cushion, preferably in a side panel 28, 29. It is understood that the locations, numbers and sizes of vent openings in an airbag cushion may vary in accordance with accepted engineering practices to accommodate the characteristics of a vehicle in which the airbag cushion will be employed.

FIG. 4 is a plan view of a first embodiment of a vent flap 32. The vent flap comprises a flexible sheet material that resists the passage of airbag inflation gas therethrough. For example, the vent flap may comprise the same material as the airbag. The vent flap does not have a vent opening therein. In this embodiment the vent flap is fixed to a vent flap pulling tether 33 and to a vent flap restraining tether 17. The vent flap restraining tether 17 extends to a tether end 18 configured to be fixed in a releasable manner to a tether end securing device 16 shown in FIG. 1 with the pin 19 of the tether end securing device received in an eyelet or loop 35 associated with the tether end. In this first embodiment of a vent flap two separate tethers 17, 33 are fixed to the vent flap by stitching 36, but it is understood that the tethers may be attached to the vent flap by an adhesive, heat welding, or any other appropriate means. The tethers 17, 33 are shown as being longitudinally aligned with one another.

FIG. 6 is a plan view of a second embodiment of a vent flap 37. The vent flap comprises a flexible sheet material that resists the passage of airbag inflation gas therethrough. The vent flap does not have a vent opening therein. In this embodiment the vent flap pulling tether 33 and the vent flap restraining tether 17 are provided by a single continuous tether that is fixed to the vent flap by stitching 36, but it is understood that the single piece tether may be attached to the vent flap by an adhesive, heat welding, or any other appropriate means. For simplicity, and consistency, throughout this description of the invention the vent flap pulling tether, or vent flap pulling portion of a continuous tether will be designated 33 and the vent flap restraining tether, or vent flap restraining portion of a continuous tether will be designated 17. The vent flap of the second embodiment will be used herein for examples of airbag vent assemblies according to the invention, but it is understood that a vent flap of the first embodiment may be employed in the same manner.

FIG. 5 is a plan view of a vent cover 40 used in the present invention. The vent cover comprises a flexible sheet material. For example, the vent flap cover may comprise the same material as the airbag. The vent cover has at least one vent opening 41 therein. The vent cover has an opening 42 therein, such as a slit or a slot, for receiving the vent flap pulling tether, or vent flap pulling portion of a continuous tether 33 when the airbag vent assembly has been assembled.

Figure 7:
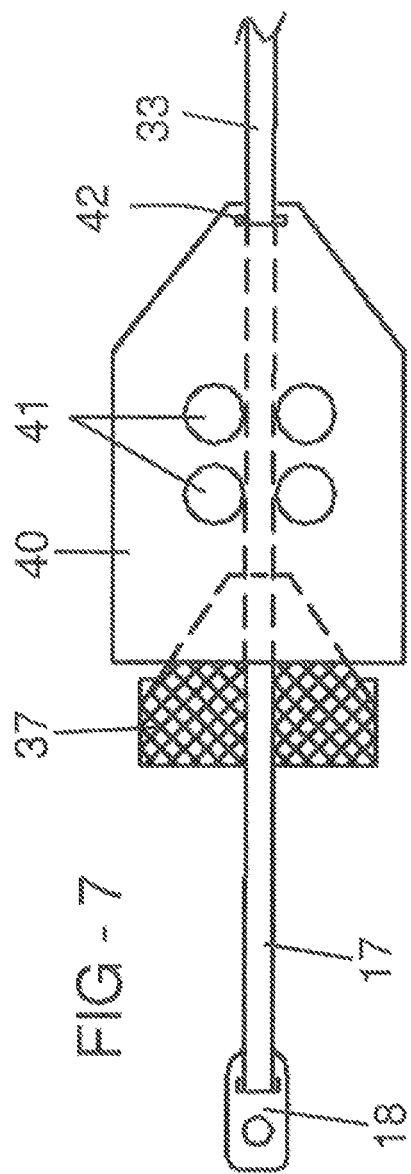
FIG. 7 is a plan view of the vent flap of FIG. 6 assembled with the vent cover of FIG. 5 wherein the vent flap is in a stored configuration.
Figure 11:
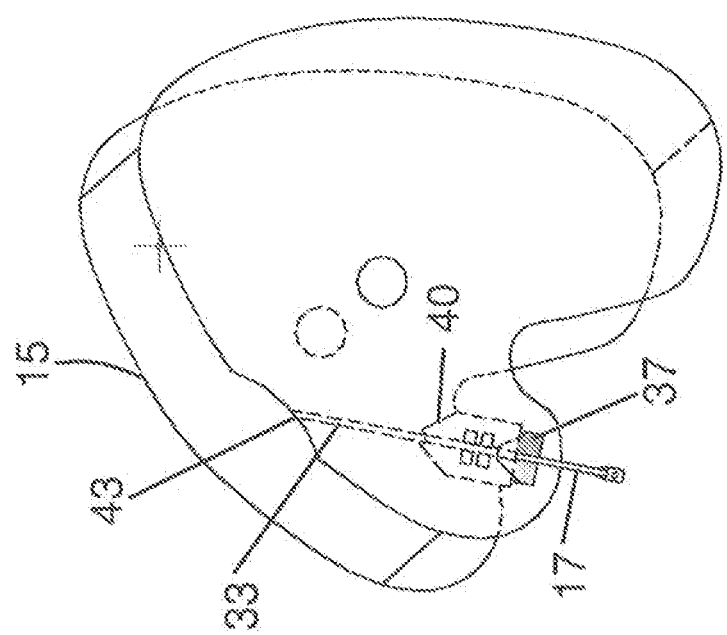
FIG. 11 is a pictorial representation of the inflatable cushion of FIG. 3 with the assembly of FIG. 7 wherein the vent flap is in a stored configuration.

FIGS. 7-12 illustrate the structure and function of an airbag cushion provided with an airbag vent assembly according to the present invention. FIGS. 7, 8 and 11 illustrate the airbag vent assembly in a stored configuration, that is to say a configuration wherein the tether end securing device 16 has not been inactivated. FIG. 7 is a plan view of the vent flap of FIG. 6 assembled with the vent cover of FIG. 5 with the vent flap in a stored configuration; FIG. 8 is a diagrammatic representation of a side section view of the assembly of FIG. 7; and FIG. 11 is a pictorial representation of the inflatable cushion of FIG. 3 with the assembly of FIG. 7 wherein the vent flap is in a stored configuration. The vent cover 40 is fixed to an interior surface of the airbag cushion 15 aligned with at least one vent opening 31 in the airbag cushion to form a pocket. As used herein and in the claims the term "pocket" is understood to have its ordinary meaning of a baglike attachment forming part of a structure as a flat pouch attached along three sides and open on one side to facilitate the placement of an object therein. Preferably the vent cover 40 is fixed to the airbag cushion with stitching, but it is understood that the vent cover may be fixed to the airbag cushion by an adhesive, heat welding, or any other appropriate means. The vent cover 40 has at least one vent opening 41 therein that allows an airbag inflation gas to escape from the airbag cushion via at least one vent opening 31 in the airbag cushion when the airbag vent assembly is in this stored configuration. The vent flap 37 is disposed at least partially within the pocket and inboard of the vent openings 31, 41 in the airbag cushion and vent cover. As used herein and in the claims the term "outboard" is understood to refer to a location or direction going towards the direction of deployment of an airbag, that is to say a direction going away from the module housing, and the term "inboard" is understood to refer to a location or direction going opposite the direction of deployment of an airbag, that is to say a direction going towards the module housing.

An inboard portion of the vent flap 37 is fixed to the airbag cushion 15 and the vent flap is folded over onto itself with the vent flap disposed at least partially within the pocket and inboard of the vent openings 30, 41 in the airbag cushion and vent cover. The vent flap is fixed to a tether, namely a vent flap pulling tether, or vent flap pulling portion 33 of a continuous tether that extends outboard from the vent flap through an opening 42 in the vent cover to a first end 43 of the tether that is attached directly to the airbag cushion outboard of the vent cover in a permanent manner such as by stitching, an adhesive, or heat welding. The vent flap restraining tether, or vent flap restraining portion 17 of a continuous tether extends inboard from the vent flap 37 to a tether end 18 that is fixed in a releasable manner to the tether end securing device 16 that is fixed directly or indirectly to the module housing 14 as best shown in FIG. 1. In this stored configuration the tether, or tethers, and the vent flap cooperate to restrict the expansion of the deploying airbag cushion to some extent in the region of the airbag cushion where the vent flap pulling tether, or vent flap pulling portion 33 of a continuous tether is permanently fixed to the airbag cushion.

Figure 9:
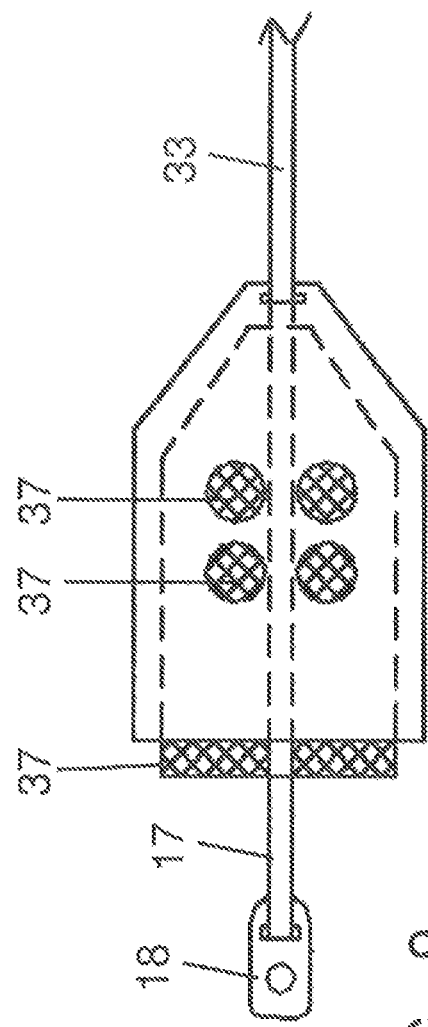
FIG. 9 is a plan view of the vent flap of FIG. 6 assembled with the vent cover of FIG. 5 wherein the vent flap is in a deployed configuration.
Figure 12:
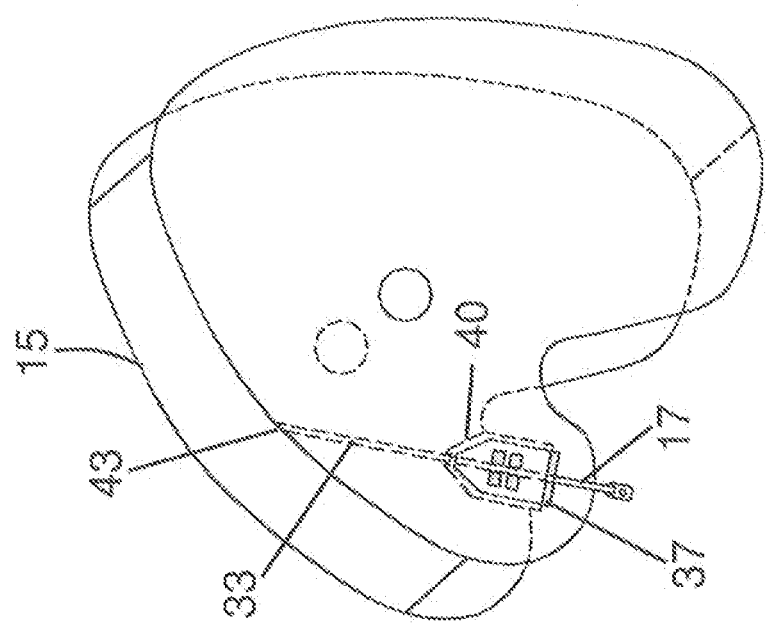
FIG. 12 is a pictorial representation of the inflatable cushion of FIG. 3 with the assembly of FIG. 9 wherein the vent flap is in a deployed configuration.

FIGS. 9, 10 and 12 illustrate the airbag vent assembly in a deployed configuration, that is to say a configuration wherein the tether end securing device 16 has been activated to release the vent flap restraining tether, or vent flap restraining portion 17 of a continuous tether. FIG. 9 is a plan view of the vent flap of FIG. 6 assembled with the vent cover of FIG. 5 with the vent flap in a deployed configuration; FIG. 10 is a diagrammatic representation of a side section view of the assembly of FIG. 9; and FIG. 12 is a pictorial representation of the inflatable cushion of FIG. 3 with the assembly of FIG. 7 wherein the vent flap is in a deployed configuration. As described above with reference to FIG. 1 the tether end securing device releases the end 18 of the vent flap restraining tether, or vent flap restraining portion 17 of a continuous tether when a sensor 20 senses a predetermined parameter and a signal is sent to the tether end securing device instructing the device to release the end of the vent flap restraining tether, or vent flap restraining portion 17 of a continuous tether during a deployment of the airbag. Thereafter due to the expansion of the airbag cushion the vent flap is pulled in an outboard direction by the vent flap pulling tether, or vent flap pulling portion 33 of a continuous tether to become interposed between the vent openings 31 in the airbag cushion and the vent openings 41 of the vent cover and prevent the escape of inflation gas from the airbag cushion through the associated vent openings in the airbag cushion and the vent cover.

Figure 14:
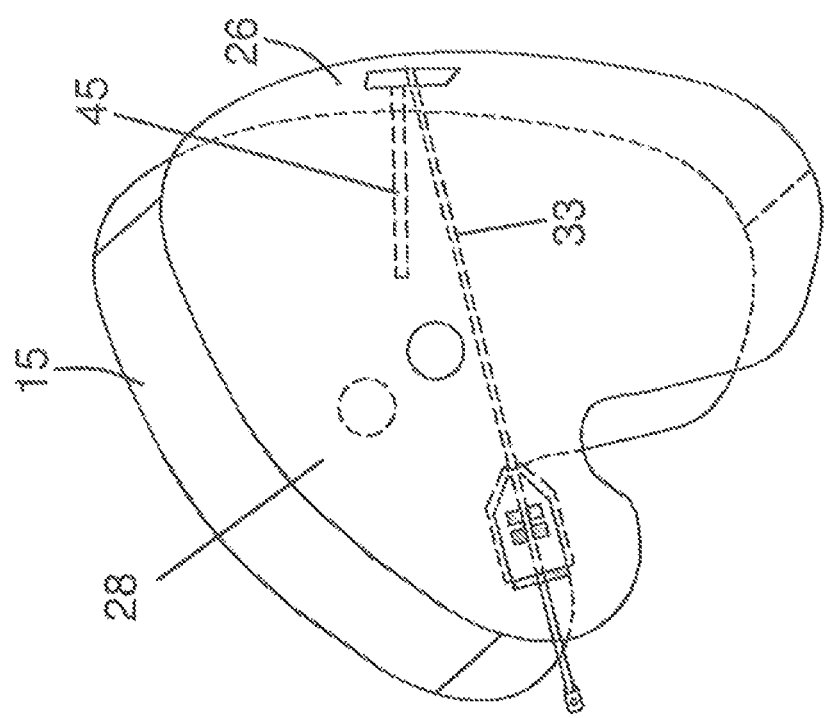
FIG. 14 is a pictorial representation like FIG. 12 with the tether attached to a front panel of the airbag.
Figure 13:
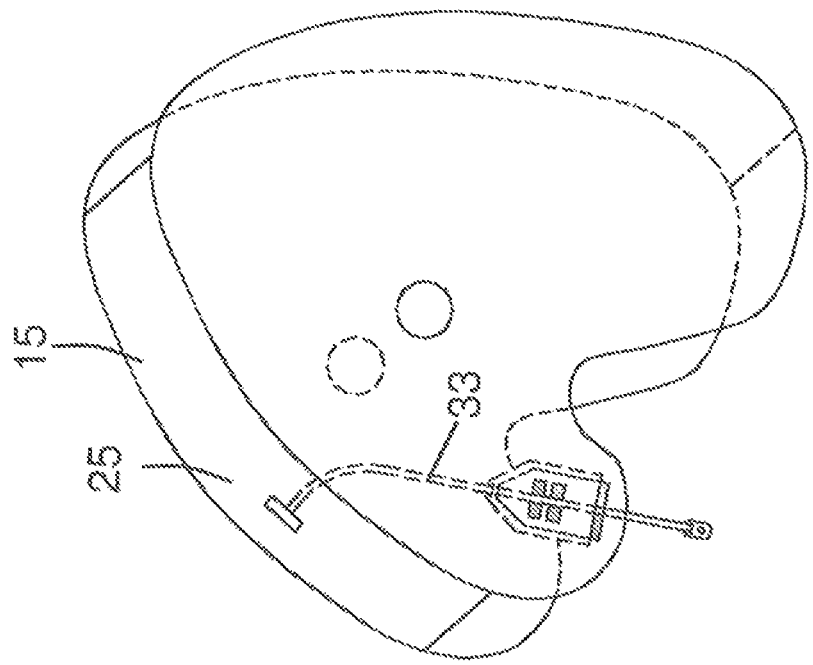
FIG. 13 is a pictorial representation like FIG. 12 with the tether attached to a top panel of the airbag at a different location.

It is understood that an engineer may customize the manner in which an airbag cushion is deployed by altering the location where the end of a vent flap pulling tether, or vent flap pulling portion 33 of a continuous tether, is permanently fixed to the airbag cushion. FIG. 13 is a pictorial representation with the vent flap pulling portion 33 of a continuous tether attached to a top panel 25 of an airbag cushion 15. FIG. 14 is a pictorial representation with the vent flap pulling portion 33 of a continuous tether attached to a front panel 26 of an airbag cushion 15. It is further understood that additional tethers that are not fixed to the vent flap may be employed in an airbag cushion such as tether 45 that extends between a side panel 28 and front panel 26 of the airbag cushion.

It is further understood that as shown in FIGS. 15-17 an airbag vent assembly of the present invention may have more than one vent flap pulling tether 33. In this embodiment the valve flap 46 has a separate vent flap restraining tether 17 like the embodiment shown and described above with respect to FIG. 4. FIG. 15 is a plan view of a vent flap 47 according to this third embodiment of the invention; FIG. 16 is a plan view of a vent flap 47 according to a fourth embodiment assembled with a vent cover 40 with the vent flap in a stored configuration; and FIG. 17 is a plan view of the vent flap of FIG. 15 assembled with a vent cover with the vent flap in a deployed configuration. In the third and fourth embodiments the vent cover has two openings 42 to accommodate the two vent flap pulling tethers 33. In all other respects these embodiments are like those described above. The geometric shapes of the vent cover and the vent flap of any embodiment of the invention are preferably complementary to one another to facilitate a successful deployment of the vent flap in the pocket. However the geometric shapes of the vent flap and the vent cover are not restricted to the tapered shapes shown in FIGS. 5-9, nor the squared off shapes shown in FIGS. 15-17, and it is understood that any appropriate shapes of these components may be selected in accordance with good engineering practices.

An optional but advantageous feature of an airbag vent assembly according to any of the above disclosed embodiments of the present invention is presented in FIGS. 18-25. The deployment of the vent flap in the pocket provided by the airbag cushion and vent cover is enhanced when the vent flap has at least one slot therein, the slot having an inboard end and an outboard end. The airbag cushion has a raised feature extending from an interior surface thereof and disposed in the slot to guide the vent flap in an outboard direction inside the pocket when the vent flap is deployed. While the raised feature may preferably be stitching, it is understood that the raised feature may alternatively be provided by a bead of an adhesive or a similar substance.

It is preferred that as shown in FIG. 18 the vent flap 50 has two pairs of parallel slots 52 therein, each slot 52 having an inboard end 51 and an outboard end 55. The airbag cushion 15 has two pairs of raised features 53 extending from an interior surface thereof with one of the raised features disposed in each slot 52 to guide the vent flap in an outboard direction inside the pocket when the vent flap is deployed. FIG. 19 is a side schematic representation of the vent flap of FIG. 18 assembled with a vent cover 40 and an airbag cushion 15, with the vent flap 50 in a stored configuration. FIG. 20 is a side schematic representation of a vent flap of FIG. 18 assembled with a vent cover and an airbag, with the vent flap in a deployed configuration.

Figure 21:
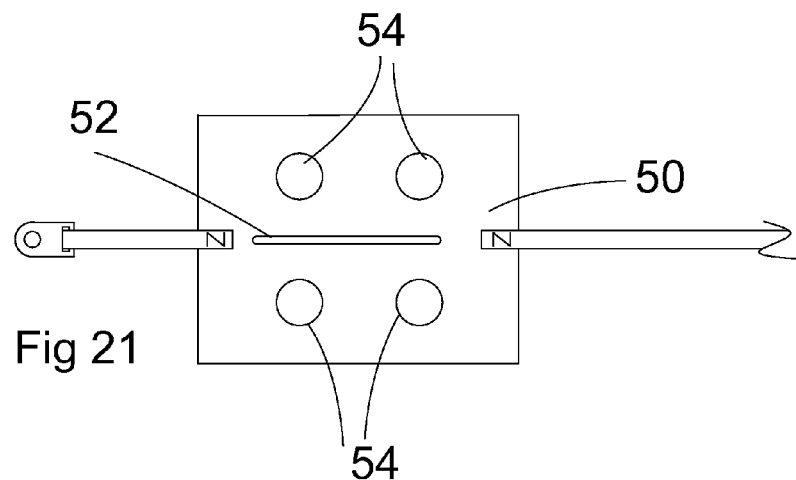
FIG. 21 is a plan view of a vent flap according to a sixth embodiment with an additional feature, namely a single longitudinal slot.

As shown in FIG. 21 the vent flap 50 has a single slot 52 therein, the slot having an inboard end and an outboard end. As described above the airbag cushion has a raised feature extending from an interior surface thereof and disposed in the slot to guide the vent flap in an outboard direction inside the pocket when the vent flap is deployed. As shown the vent flap is fixed to a separate vent flap pulling tether and to a separate vent flap restraining tether, but it is understood that a single tether having a vent flap pulling portion and a vent flap restraining portion could be employed in this embodiment.

Figure 22:
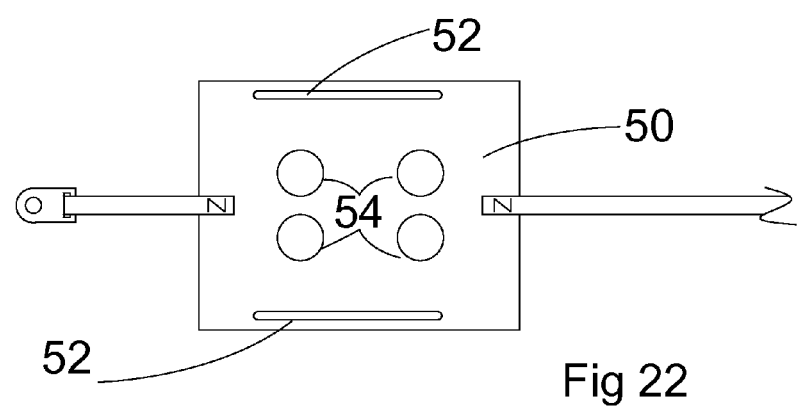
FIG. 22 is a plan view of a vent flap according to a seventh embodiment with an additional feature, namely a single pair of parallel slots.

In a further alternative, shown in FIG. 22, a vent flap 50 has a single pair of parallel slots 52 therein, each slot having an inboard end and an outboard end. As described above the airbag cushion has a pair of raised features extending from an interior surface thereof with one of the raised features disposed in each slot to guide the vent flap in an outboard direction inside the pocket when the vent flap is deployed. As shown the vent flap is fixed to a separate vent flap pulling tether and to a separate vent flap restraining tether, but it is understood that a single tether having a vent flap pulling portion and a vent flap restraining portion could be employed in this embodiment.

Figure 23:
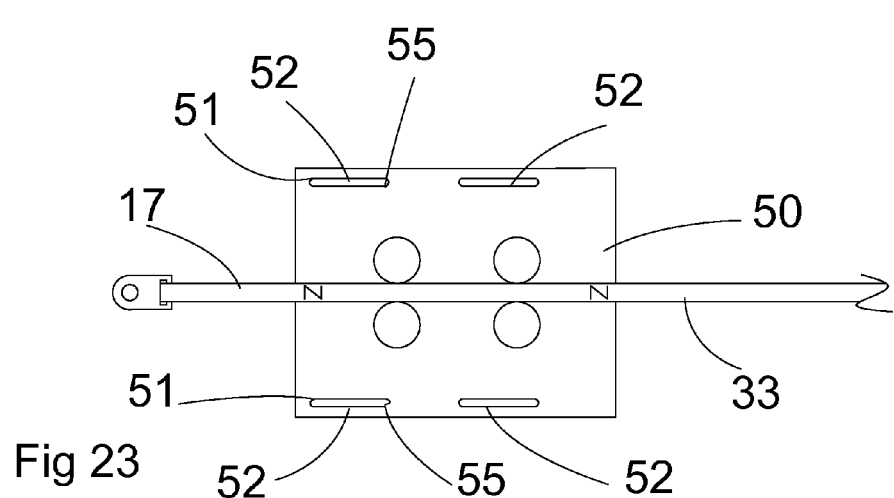
FIG. 23 is a plan view of a vent flap according to an eighth embodiment that is similar to the embodiment of FIG. 18 wherein the tether comprises only a single piece.

In a further alternative, shown in FIG. 23, a vent flap is similar to the embodiment of FIG. 18, wherein the vent flap 50 has two pairs of parallel slots 52 therein, each slot 52 having an inboard end and an outboard end. Like the embodiment in FIG. 18 the airbag cushion will have two pairs of raised features extending from an interior surface thereof with one of the raised features disposed in each slot to guide the vent flap in an outboard direction inside the pocket when the vent flap is deployed. As shown the vent flap is fixed to a tether comprising a single piece having a vent flap pulling portion and a vent flap restraining portion, but it is understood that a separate vent flap pulling tether and to a separate vent flap restraining tether could be employed in this embodiment.

In the vent flaps 50 of FIGS. 21-23 the vent flaps have at least one vent opening 54, and may have a plurality of vent openings therein. When these embodiments are made part of an assembly with an airbag and vent cover the opening, or openings 54 in the vent flap are each aligned with a corresponding vent opening 31 in the airbag.

FIG. 24 is a plan view of the vent flap 50 of FIG. 23 assembled with a vent cover 56 wherein the vent flap is in a stored configuration, and FIG. 25 is a plan view of the vent flap of FIG. 23 assembled with a vent cover 56 wherein the vent flap is in a deployed configuration. In FIG. 24 vent openings 54 in the stored vent flap 50 are aligned with vent openings 31 in the airbag and vent openings 58 in the vent cover 56. In FIG. 25 the vent openings 31 in the airbag and vent openings 58 in the vent cover are closed by the deployed vent flap 50. These figures clearly illustrate the two pairs of raised features 53 extending from an interior surface thereof with one of the raised features disposed in each slot 52 to guide the vent flap in an outboard direction inside the pocket when the vent flap is deployed.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. An airbag for restraining a vehicle occupant comprising an inflatable airbag cushion comprising a flexible sheet material that has at least one vent opening therein, a vent cover comprising a flexible sheet material is fixed to an interior surface of the airbag cushion aligned with the vent opening in the airbag cushion to form a pocket, the vent cover having at least one vent opening therein that allows an airbag inflation gas to escape from the airbag cushion via the vent opening in the airbag cushion, a vent flap comprising a flexible sheet material is disposed at least partially within the pocket and inboard of the vent openings in the airbag cushion and vent cover, the vent flap being fixed to a tether that extends outboard from the vent flap through an opening in the vent cover to a first end of the tether that is attached directly to the airbag cushion outboard of the vent cover in a permanent manner, the tether also extending inboard from the vent flap to a second end of the tether that is fixed in a releasable manner to a device that releases the second end of the tether when a sensor senses a predetermined parameter and a signal is sent to the device instructing the device to release the second end of the tether during a deployment of the airbag whereby the vent flap is pulled in an outboard direction by the tether to become interposed between the vent openings in the airbag cushion and the vent cover and prevent the escape of inflation gas from the airbag cushion through the vent openings in the airbag cushion and the vent cover; and wherein the vent flap has two pairs of parallel slots therein, each slot having an inboard end and an outboard end, the airbag cushion having two pairs of raised features extending from an interior surface thereof with one of the raised features disposed in each slot to guide the vent flap in an outboard direction inside the pocket when the vent flap is deployed.

2. The airbag for restraining a vehicle occupant according to claim 1 wherein each raised feature comprises stitching.

3. An airbag for restraining a vehicle occupant comprising an inflatable airbag cushion comprising a flexible sheet material that has at least one vent opening therein, a vent cover comprising a flexible sheet material is fixed to an interior surface of the airbag cushion aligned with the vent opening in the airbag cushion to form a pocket, the vent cover having at least one vent opening therein that allows an airbag inflation gas to escape from the airbag cushion via the vent opening in the airbag cushion, a vent flap comprising a flexible sheet material is disposed at least partially within the pocket and inboard of the vent openings in the airbag cushion and vent cover, the vent flap being fixed to at least one vent flap pulling tether that extends outboard from the vent flap through an opening in the vent cover to an end of the vent flap pulling tether that is attached directly to the airbag cushion outboard of the vent cover in a permanent manner, the vent flap is also fixed to a vent flap restraining tether that extends inboard from the vent flap to an end of the vent flap restraining tether that is fixed in a releasable manner to a device that releases a second end of the tether when a sensor senses a predetermined parameter and a signal is sent to the device instructing the device to release a second end of the vent flap restraining tether during a deployment of the airbag whereby the end of the vent flap restraining tether is released and the vent flap is pulled in an outboard direction by the at least one vent flap pulling tether to become interposed between the vent openings in the airbag cushion and the vent cover and prevent the escape of inflation gas from the airbag cushion through the vent openings in the airbag cushion and the vent cover; and wherein the vent flap has two pairs of parallel slots therein, each slot having an inboard end and an outboard end, the airbag cushion having two pairs of raised features extending from an interior surface thereof with one of the raised features disposed in each slot to guide the vent flap in an outboard direction inside the pocket when the vent flap is deployed.

4. The airbag for restraining a vehicle occupant according to claim 3 wherein each raised feature comprises stitching.

5. An airbag module for restraining a vehicle occupant comprising:
   (a) a module housing;
   (b) an inflator located in the module housing for providing an inflation gas to an inflatable airbag cushion that is fixed to the module housing;
   (c) the inflatable airbag cushion comprising a flexible sheet material that has at least one vent opening therein;
   (d) a vent cover comprising a flexible sheet material is stitched to an interior surface of the airbag cushion aligned with the vent opening in the airbag cushion to form a pocket, the vent cover having at least one vent opening therein that allows an airbag inflation gas to escape from the airbag cushion via the vent opening in the airbag cushion, a vent flap comprising a flexible sheet material is disposed at least partially within the pocket and inboard of the vent openings in the airbag cushion and vent cover that is aligned with the vent openings in the airbag and the vent cover when the vent flap is in a stored configuration, the vent flap being fixed to at least one tether, wherein a tether extends outboard from the vent flap through an opening in the vent cover to a tether end that is attached directly to the airbag cushion outboard of the vent cover in a permanent manner, and wherein a tether extends inboard from the vent flap to a tether end that is fixed in a releasable manner to a tether end securing device that is fixed directly or indirectly to the module housing and that releases the releasable tether end when a sensor senses a predetermined parameter and a signal is sent to the device instructing the device to release the releasable tether end during a deployment of the airbag whereby the vent flap is pulled in an outboard direction by a tether to close the vent openings in the airbag cushion and the vent cover and prevent the escape of inflation gas through the vent openings in the airbag cushion and the vent cover when the vent flap is deployed; and wherein the vent flap has two pairs of parallel slots therein, each slot having an inboard end and an outboard end, the airbag cushion having two pairs of raised features extending from an interior surface thereof with one of the raised features disposed in each slot to guide the vent flap in an outboard direction inside the pocket when the vent flap is deployed.

6. The airbag module for restraining a vehicle occupant according to claim 5 wherein the vent openings in the airbag cushion and the vent cover are aligned with one another.

7. The airbag module for restraining a vehicle occupant according to claim 5 wherein each raised feature comprises stitching.

* * * * *